United States Patent
Pandura

(10) Patent No.: US 6,846,031 B2
(45) Date of Patent: Jan. 25, 2005

(54) INDICATING INSTRUMENT ASSEMBLY HAVING A HOUSING AND METHOD OF MAKING SAME

(75) Inventor: Michael Pandura, Weinsberg (DE)

(73) Assignee: Dr. Ing h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/622,138

(22) Filed: Jul. 18, 2003

(65) Prior Publication Data

US 2004/0090079 A1 May 13, 2004

(30) Foreign Application Priority Data

Jul. 18, 2002 (DE) .......................................... 102 32 601

(51) Int. Cl.⁷ .............................................. B62D 25/14
(52) U.S. Cl. .............................. 296/70; 296/72; 180/90
(58) Field of Search ........................ 296/70, 72; 180/90

(56) References Cited

U.S. PATENT DOCUMENTS

| 4,372,412 A | * | 2/1983 | Fujii et al. ..................... 180/90 |
| 4,623,729 A | | 11/1986 | Natarajan et al. ............ 546/256 |
| 6,474,431 B1 | * | 11/2002 | Baker et al. ................... 180/90 |
| 6,517,139 B2 | * | 2/2003 | Sutou et al. ................... 296/70 |
| 6,582,005 B2 | * | 6/2003 | Takano ......................... 296/70 |
| 6,634,693 B2 | * | 10/2003 | Straesser, Jr. ................ 296/70 |

FOREIGN PATENT DOCUMENTS

| DE | 19 93 4446 | 2/2000 |
| EP | 1 013 496 A2 | 6/2000 |
| FR | 2 796 599 | 1/2001 |

OTHER PUBLICATIONS

European Search Report dated Sep. 24, 2003.

* cited by examiner

Primary Examiner—Stephen Gordon
(74) Attorney, Agent, or Firm—Crowell & Moring LLP

(57) ABSTRACT

The indicating instruments can be shielded against the incidence of light, a top and a bottom cover are provided on a housing of the indicating instruments. These covers are fitted into groove-shaped receiving devices of a front-mounted frame connected with the housing. At the inserted edge, the covers have a flexible strip as well as opposite flexible noses. After the fitting of the flexible edge into the groove-shaped receiving device, an uncoupling of vibrations and a compensation of tolerances are achieved.

20 Claims, 5 Drawing Sheets

INDICATING INSTRUMENT ASSEMBLY HAVING A HOUSING AND METHOD OF MAKING SAME

BACKGROUND AND SUMMARY OF THE INVENTION

This application claims the priority of German Application No. 102 32 601.0 filed Jul. 18, 2002, the disclosure of which is expressly incorporated by reference herein.

The invention relates to an indicating instrument assembly having a housing. Preferred embodiments of the invention relate to such an indicating instrument assembly for a passenger motor vehicle and including a front mounted frame which can be connected with at least one instrument cover.

From German Patent Document DE 199 34 446 A1, an indicating instrument having a housing is known, which has a frontal frame holding a cover plate and can be inserted into a recess of an instrument panel of a motor vehicle. So that a secure and exact mutual arrangement of the cover plate and the frontal frame as well as of the indicating instruments in the instrument panel is achieved, an elastic connection element is arranged between the cover plate and the frontal frame, which connection element may be constructed in one piece with the cover plate or the frontal frame.

It is an object of the invention to create an indicating instrument having a housing which in a simple manner can be connected with one or more covers.

According to certain preferred embodiments of the invention, this object is achieved by providing an indicating instrument assembly having a housing which has a front-mounted frame which can be connected with at least one instrument cover, wherein groove-shaped receiving devices are formed in the front-mounted frame between upright borders for the individual instruments and corresponding projecting edge-side frames or frame sections, into which receiving devices, the instrument cover can be fitted by means of a flexible edge. Further advantageous features of preferred embodiments of the invention are set for herein and in the claims.

Important advantages achieved by means of the invention are that the covers which can be inserted into the housing for the instruments are fitted into a groove-shaped receiving device of the housing or of a front-mounted frame. In particular, it is provided according to certain preferred embodiments of the invention that groove-shaped receiving devices are formed in the front-mounted frame between upright borders for the instruments and projecting edge-side frames or frame sections, into which receiving devices the instrument covers are fitted by means of a flexible elastic edge. It is thereby advantageously achieved that there is an uncoupling of vibrations of these covers an uncoupling of vibrations with respect to the front-mounted frame of the housing as well as a certain tolerance compensation are provided.

In particular preferred embodiments, the flexible edge consists of a flexible lip which is connected with the rigid instrument cover and which encloses a free-standing fixed edge of the instrument cover, in which case, this flexible lip can be connected with the rigid instrument cover by means of a two-component injection molding process. By shaping the flexible lip to the free edge of the instrument cover, an area is created on the latter which projects away from the rigid cover and which, in the fitted-in mounted position, is enclosed directly by the receiving device in the front-mounted frame.

Since the flexible lip by means of a flexible strip projects at least from one surface of the instrument cover, and furthermore, the flexible lip has flexible noses projecting at least from one surface of the instrument cover, which noses are arranged on an opposite side of the edge and the flexible strip, an optimal clamping connection is achieved in the groove-shaped receiving device of the front-mounted frame. This strip, which projects on the interior and/or exterior surface of the instrument cover, and projecting noses have the advantageous effect that a certain elastic cushioning of the cover takes place with respect to the receiving device, and, as a result, an unfavorable vibration influence is avoided. In addition, as a result of the flexible projecting noses, a simplified mounting or fitting into the receiving device as well as a tolerance compensation is achieved. In addition, a direct resting of the rigid cover surfaces on the opposite surfaces of the recess in the front-mounted frame is avoided.

In the case of certain preferred embodiments, it is provided that the noses project from an exterior surface of the instrument cover and the flexible strip is arranged on an interior surface. Furthermore, it is provided that the flexible edge is held clamped into the groove-shaped receiving device such that the rigid instrument cover comes to be situated at a distance from the wall surfaces of the receiving device.

The surrounding flexible strip on the interior surface of the cover causes a continuous closure in the visible area upon the instruments, which closure cannot be achieved by means of the noses on the exterior surface of the cover.

Other objects, advantages and novel features of the present invention will become apparent from the following detailed description of the invention when considered in conjunction with the accompanying drawings.

DETAILED DESCRIPTION OF THE DRAWINGS

Figure 1:
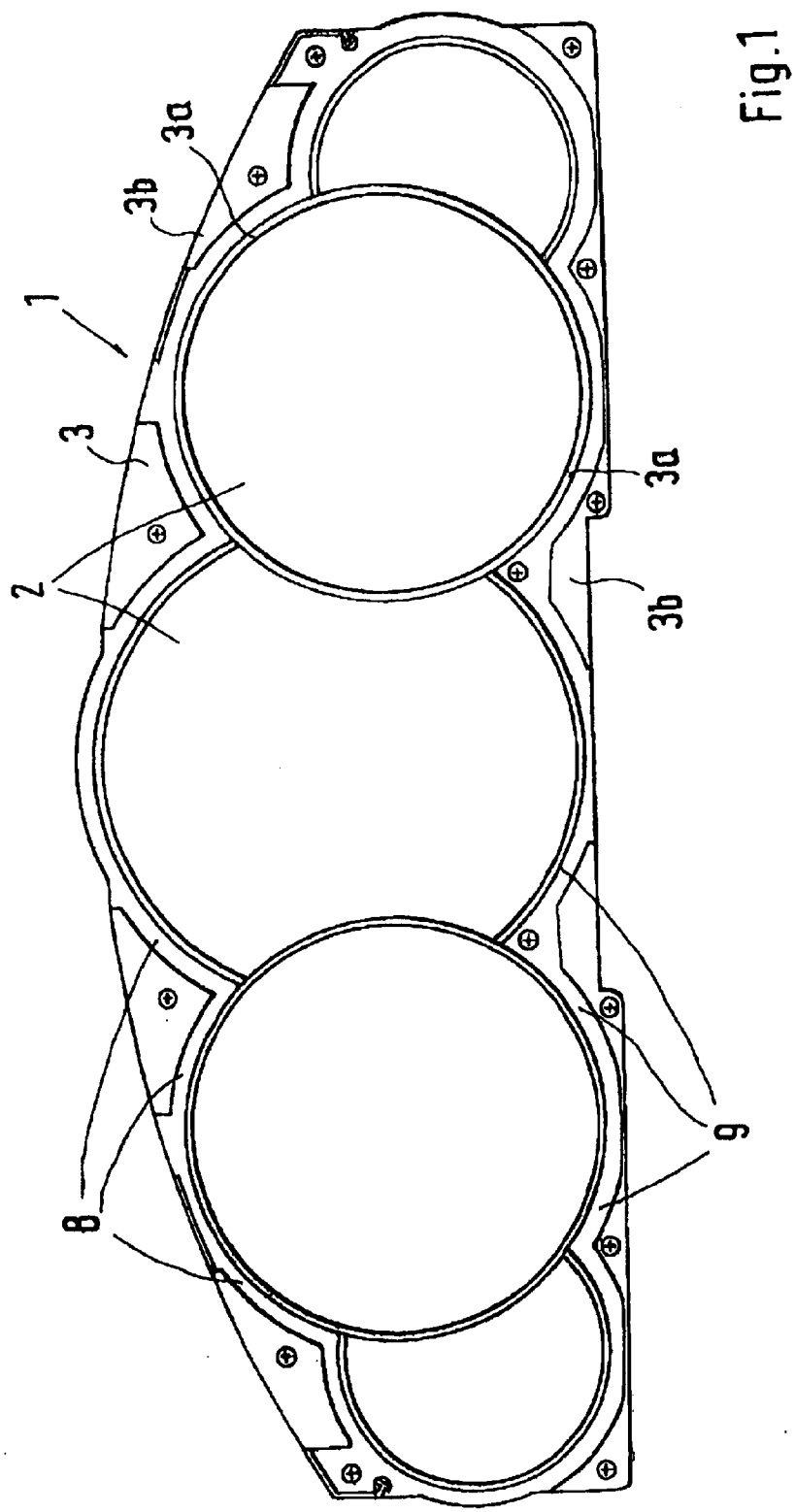
FIG. 1 is a frontal view of indicating instruments inserted in a housing with a front-mounted frame and a groove-shaped receiving device for the instrument covers, constructed according to a preferred embodiment of the invention.
Figure 2:
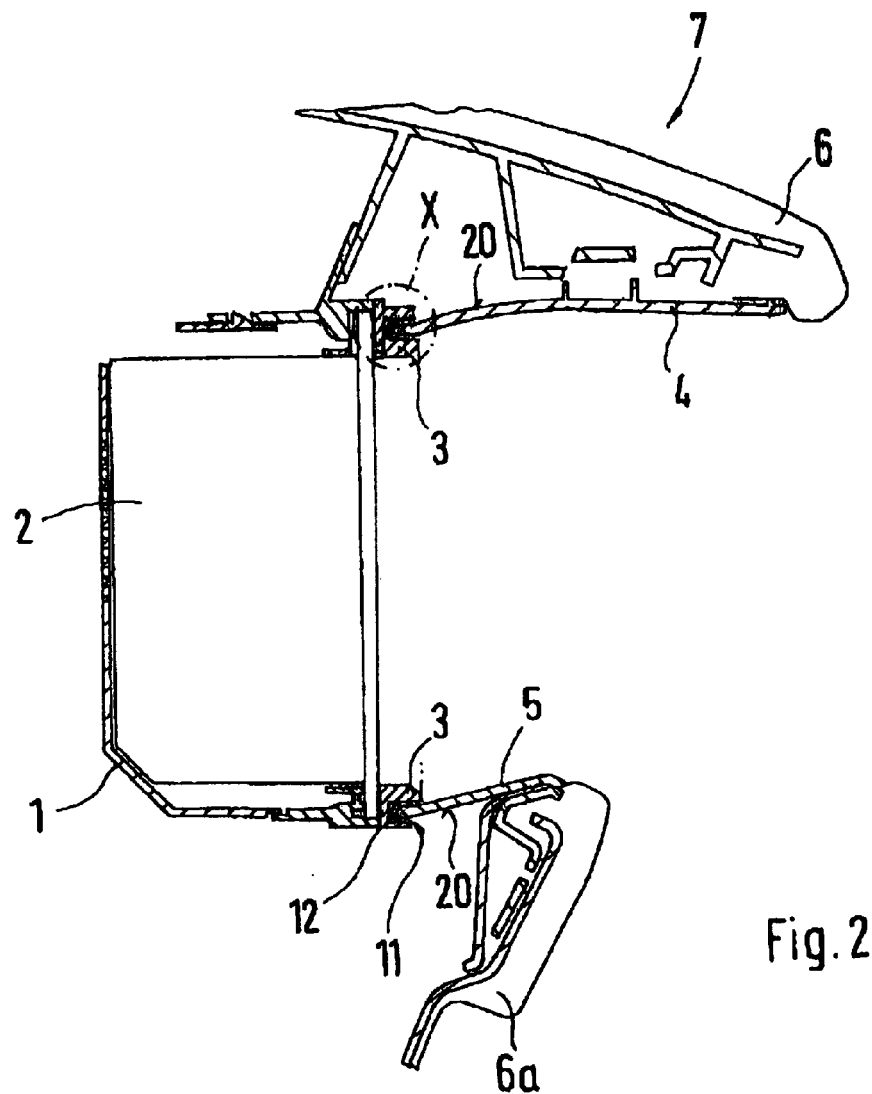
FIG. 2 is a sectional view of an indicating instrument assembly with inserted upper and lower covers, constructed according to a preferred embodiment of the invention.
Figure 3:
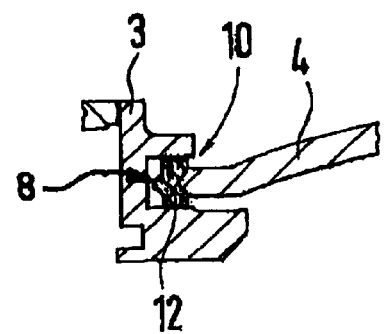
FIG. 3 is an enlarged representation according to detail X in FIG. 2.
Figure 4:
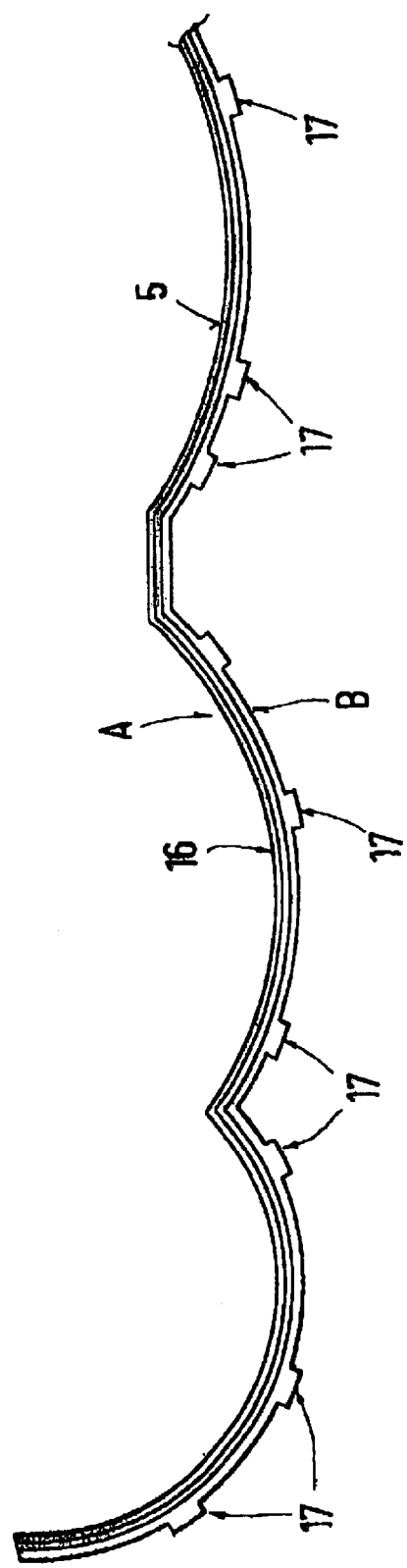
FIG. 4 is a diagrammatic view of a cover with a flexible lip, constructed according to a preferred embodiment of the invention.
Figure 5:
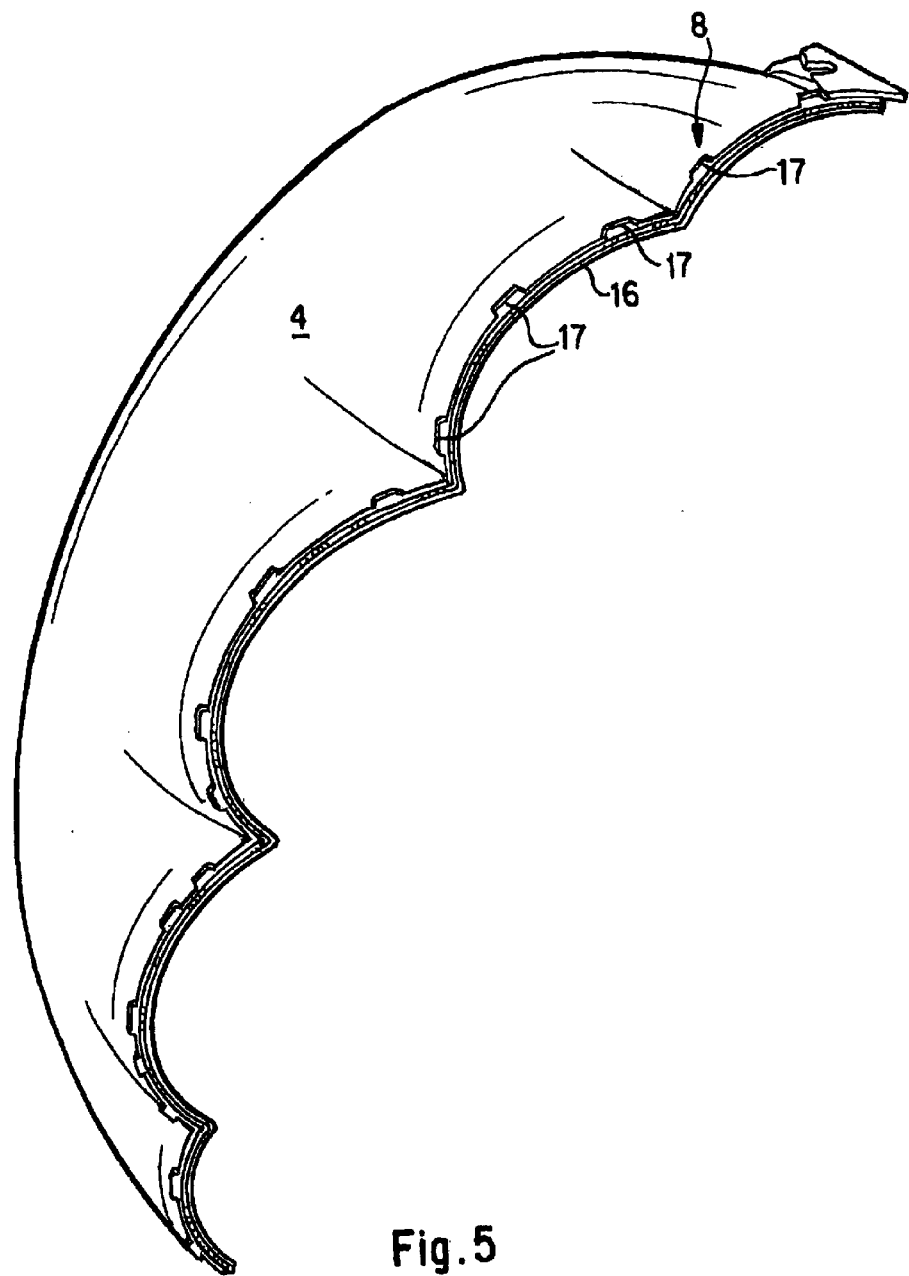
FIG. 5 is a perspective view of the top instrument cover depicted in the other drawing figures.
Figure 7:
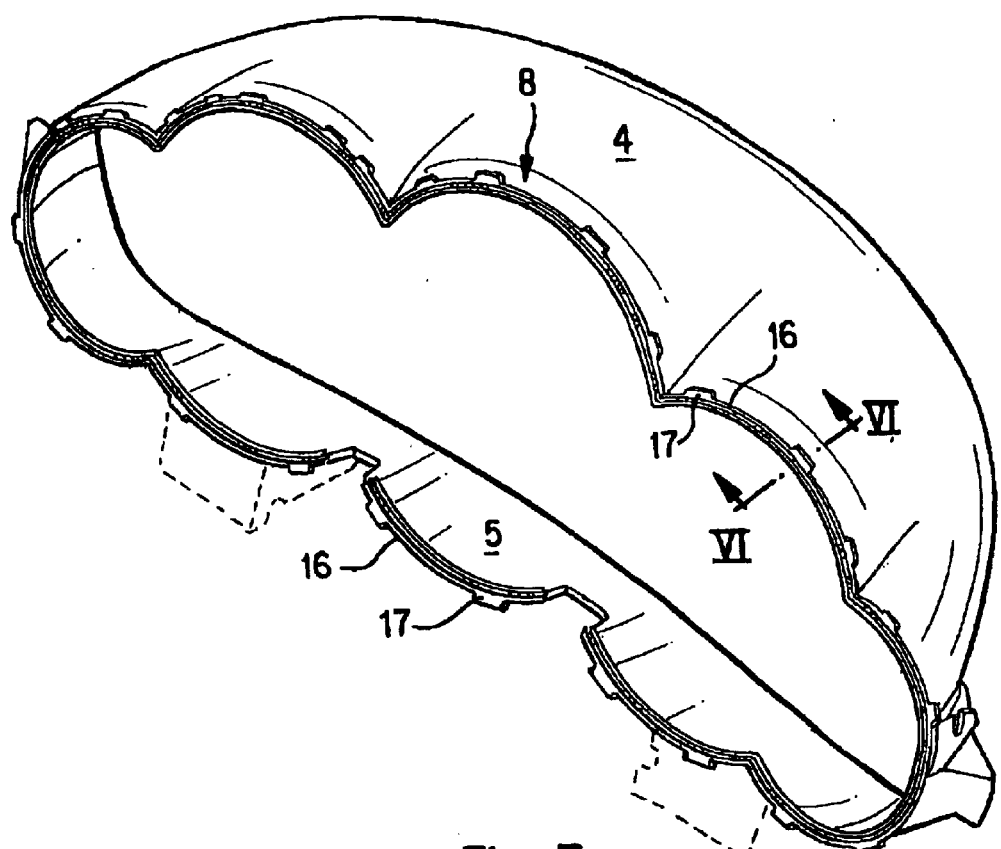
FIG. 7 is a schematic perspective view showing the top and bottom instructed covers connected together.
Figure 6:
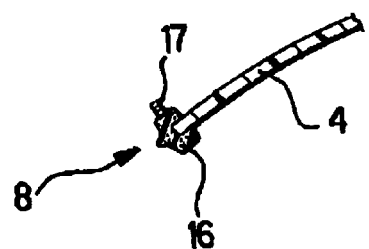
FIG. 6 is an enlarged sectional view of an edge or rim of the top instrument cover taken along line VI—VI of FIG. 7.

Several indicating instruments 2 are arranged in a housing 1 and are surrounded by a covering frame 3 on the front side. An upper instrument cover 4 and a lower instrument cover 5 (not shown in FIG. 1) are connected with this covering frame 3. By way of trim panels 6, 6a, the instrument covers 4 and 5 are integrated in the dashboard 7 of a vehicle as depicted in FIG. 2.

The front-mounted frame 3 comprises, for the connection with the covers 4 and 5, groove-shaped receiving devices 8, 9, which partially surround the instruments 2 and are situated between upright borders 3a and between edge-side frames or frame sections 3b. The exposed edges 10, 11 of the covers 4, 5 include a flexible lip 12 which is fitted into these receiving devices 8, 9 such that these form a shielding for the instruments 2.

The flexible lip 12 on the respective edges 10, 11 is constructed in one piece with the associated rigid cover 4, 5. In particular, the flexible lip 12 is connected with the associated rigid instrument cover 4, 5 by means of a two-component injection molding process.

The flexible lip 12 is constructed such that a flexible strip 16 is formed on a side A of the cover 4, 5 and, in addition, flexible noses 17 are formed on an opposite side B of the cover 4, 5.

In particular, the flexible noses 17 project away from the exterior surface B of the covers 4, 5, the flexible strip 16 extending away from the interior surface A. The flexible noses 17 serve to accommodate tolerances in the size of the grooves of devices 8, 9 of the covering frame 3. Other embodiments are contemplated with the flexible strip 16 extending away from both surfaces A and B and without such flexible noses. However the new embodiments with flexible noses are most preferred because of their tolerance accommodating function.

With their exposed flexible edges 10, 11, which form so-called flexible lips 12, with a projecting strip 16 and projecting noses 17, the covers 4, 5 are pressed into the groove-shaped receiving devices 8, 9 and are held therein in a clamping manner. The projecting strip 16 as well as the projecting noses 17 have a flexible construction and place themselves elastically against the walls of the receiving devices 8, 9. A further fastening of the covers 4, 5 takes place by way of fastening screws on the dashboard 7, which is not illustrated in detail.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Indicating instrument assembly having a housing which has a front-mounted frame which can be connected with at least one instrument cover,
    wherein groove-shaped receiving devices are formed in the front-mounted frame between upright borders for individual instruments and corresponding projecting edge-side frames or frame sections, into which receiving devices the instrument cover can be fitted by means of a flexible edge.

2. Indicating instrument assembly according to claim 1, wherein the flexible edge comprises a flexible lip which is connected with the instrument cover and which encloses an exposed edge of the instrument cover.

3. Indicating instrument assembly according to claim 2, wherein the flexible lip is connected with the instrument cover by means of a two-component injection molding process.

4. Indicating instrument assembly according to claim 2, wherein the flexible lip includes a flexible strip which projects at least from a surface of the instrument cover.

5. Indicating instrument assembly according to claim 3, wherein the flexible lip includes a flexible strip which projects at least from a surface of the instrument cover.

6. Indicating instrument assembly according to claim 2, wherein the flexible lip has flexible noses which project from at least one surface of the instrument cover and which are arranged on an opposite side surface with respect to the flexible edge with a flexible strip.

7. Indicating instrument assembly according to claim 3, wherein the flexible lip has flexible noses which project from at least one surface of the instrument cover and which are arranged on an opposite side surface with respect to the flexible edge with a flexible strip.

8. Indicating instrument assembly according to claim 4, wherein the flexible lip has flexible noses which project from at least one surface of the instrument cover and which are arranged on an opposite side surface with respect to the flexible edge with the flexible strip.

9. Indicating instrument assembly according to claim 6, wherein the noses project from an exterior surface of the instrument cover, and the flexible strip is constructed to project from an interior surface.

10. Indicating instrument assembly according to claim 1, wherein the flexible edge is held clamped into a respective one of the groove-shaped receiving devices in such a manner that the instrument cover comes to be situated at a distance from a wall of the receiving devices.

11. Indicating instrument assembly according to claim 2, wherein the flexible edge is held clamped into a respective one of the groove-shaped receiving devices in such a manner that the instrument cover comes to be situated at a distance from a wall of the receiving devices.

12. Indicating instrument assembly according to claim 3, wherein the flexible edge is held clamped into a respective one of the groove-shaped receiving devices in such a manner that the instrument cover comes to be situated at a distance from a wall of the receiving devices.

13. Indicating instrument assembly according to claim 4, wherein the flexible edge is held clamped into a respective one of the groove-shaped receiving devices in such a manner that the instrument cover comes to be situated at a distance from a wall of the receiving devices.

14. Indicating instrument assembly according to claim 6, wherein the flexible edge is held clamped into a respective one of the groove-shaped receiving devices in such a manner that the instrument cover comes to be situated at a distance from a wall of the receiving devices.

15. Indicating instrument assembly according to claim 9, wherein the flexible edge is held clamped into a respective one of the groove-shaped receiving devices in such a manner that the instrument cover comes to be situated at a distance from a wall of the receiving devices.

16. A vehicle instrument panel assembly comprising:
    a covering frame operable to support a plurality of instrument indicators, said covering frame including grooves facing toward a vehicle passenger space when in an in use position on a vehicle, and
    an instrument cover having a relatively rigid cover portion joined at an edge rim by a flexible elastic edge portion which is fittingly engageable in said grooves to support the instrument cover at said covering frame.

17. An instrument cover operable to cover a plurality of instrument indicators supported at a covering frame having grooves facing toward a vehicle passenger space when in an in use position on a vehicle, said cover comprising:

a rigid cover portion joined at an edge rim thereof by a flexible elastic edge portion which is fittingly engageable in said grooves to support the instrument cover at said covering frame.

18. An instrument cover according to claim 17, wherein the flexible elastic edge portion includes laterally protruding noses which in use serve to accommodate tolerances in respective grooves and edges to assure a secure fit of the cover at the covering frame.

19. An instrument cover according to claim 18, wherein the flexible elastic edge portion is connected with the rigid cover portion by a two component injection molding process.

20. A method of making the cover of claim 17, comprising using a two component injection molding process to mold said cover.

* * * * *